United States Patent [19]
Plumat et al.

[11] 3,944,713
[45] Mar. 16, 1976

[54] METHOD AND APPARATUS FOR PRE-HEATING VITRIFIABLE BATCH

[75] Inventors: Emile Plumat, Gilly; Jean-Pierre Mairesse, Ransart, both of Belgium

[73] Assignee: Glaverbel-Mecaniver, Watermael-Boitsfort, Belgium

[22] Filed: Aug. 29, 1974

[21] Appl. No.: 502,236

[30] Foreign Application Priority Data
Sept. 5, 1973 Belgium .................................. 68363

[52] U.S. Cl. ............................. 13/6; 13/34; 65/134
[51] Int. Cl.² ...................... C03B 1/00; C03B 5/02
[58] Field of Search ... 13/6, 33, 34; 65/134, DIG. 8, 65/335

[56] References Cited
UNITED STATES PATENTS

| | | | |
|---|---|---|---|
| 2,564,783 | 8/1951 | Howard | 13/6 X |
| 3,172,648 | 3/1965 | Brichard | 65/335 X |
| 3,320,045 | 5/1967 | Weiss et al. | 65/DIG. 8 |

*Primary Examiner*—R. N. Envall, Jr.
*Attorney, Agent, or Firm*—Spencer & Kaye

[57] ABSTRACT

Method and apparatus for pre-heating a vitrifiable batch before it is introduced into a glass melting furnace. The hot gases from the furnace are used for this purpose. The batch is fed onto a support which provides apertures or openings. The support and the batch on it are heated by hot gases from the furnace until the batch is in at least a partly molten condition in which it flows through the support apertures.

30 Claims, 4 Drawing Figures

METHOD AND APPARATUS FOR PRE-HEATING VITRIFIABLE BATCH

BACKGROUND OF THE INVENTION

This invention relates to a process for pre-heating a vitrifiable batch prior to its introduction into a glass-melting furnace, in which pre-heating use is made of hot gases from the melting furnace. The invention also relates to apparatus for carrying out this process.

It is known to pre-heat a vitrifiable batch during its feed to a glass-melting furnace by feeding the batch in counter-current to hot gases escaping from the furnace. The gases thereby pre-heat the batch by heat-exchange.

The known processes can be roughly divided into three categories. In known processes of a first category the batch is allowed to fall freely in a shaft which also serves as a chimney for gases escaping from the furnace. The batch is thus heated by heat-exchange as it falls towards the furnace entrance. Such processes are not considered to be satisfactory for a number of reasons. One reason is the low heat recovery due to the brevity of the heat-exchange contact between the batch and the hot gases. A second objection to such processes is the fact that the batch entering the furnace tends to be of uncontrolled variable composition due to the segregation of batch constituents of different sizes and specific gravities during their fall. This lack of uniformity in the feed to the furnace tends to be greater when there is a longer fall path of the batch in heat exchange relationship to the hot gases.

The second category of known processes comprises those in which the batch forms a column in a feed shaft through which the hot gases can pass via the labyrinth of spaces between the individual batch pieces or particles. This type of feed system cannot be used for batches in powder form because the column of powder is substantially impervious to the furnace gases. This feed system is only applicable for feeding batches in the form of granules or pieces large enough to ensure that the batch column is pervious to the furnace gases. Experience shows that even when the batch forms a gas-pervious column, the feed to the furnace is not satisfactory. The feed of batch to the furnace is irregular and substantial variation in the temperature to which different parts of the batch are pre-heated cannot be avoided. These irregularities render it very difficult to sustain given quality standards in the production and conditioning of molten glass in the furnace.

In the known processes of the third category, the batch is delivered into a feed shaft wherein there are baffle walls past which the furnace gases can flow and which are constructed and arranged to catch at least some of the delivered batch. The baffle walls are constructed and arranged so that any batch material falling thereon is retained until, due to melting of batch constituents, it acquires a flowable condition and can flow along the baffle walls and pour over the edges thereof, into the furnace. With this system it should be possible to avoid undesirable variations in course of time in the pre-heated condition of the batch entering the furnace. However, in practice the feed rate is very irregular. It has proved to be impossible to prevent interruptions in the flow of batch off the baffle walls due to batch material thereon becoming sintered or retained at positions where it is not adequately exposed to the hot gases with the result that such material forms a barrier obstructing the continuous flow of material along the baffle walls.

SUMMARY OF THE INVENTION

An object of the present invention is to avoid these disadvantages of the known systems.

Another object of the present invention is to provide a pre-heating process whereby a regular feed of batch of substantially uniform composition and in a substantially uniform pre-heated condition can be achieved.

It is also an object of the invention to provide a process whereby at the same time a very significant heat recovery from the furnace gases may be realized.

A program according to the present invention is performed by having at least part of the batch fed onto at least one apertured segment which is directly exposed to gases from the furnace. Batch material is temporarily retained by such support and heated thereon until it is in a molten or partly molten condition in which it flows through the support apertures.

The process according to the invention affords the important advantage of maintaining a substantially uniform condition of the batch feeding to the furnace from the supports. This is because the batch material is retained on the support until it is in sufficiently flowable condition to flow downwardly through the support apertures. In other words each support prevents quantities of batch material delivered onto such support from descending into the furnace before the material has been brought to an at least partially melted condition. This condition, which corresponds with a certain viscosity of the batch material, is determined largely by the dimensions of the support apertures and necessarily remains substantially constant in course of time during the furnace operation.

Another important advantage of the process according to the invention is that feed of batch material from the supports cannot be obstructed by material which is not being heated to flowable condition. As soon as batch material immediately superadjacent a support attains a sufficiently flowable condition it descends through the immediately underlying support apertures and allows overlying batch material to take its place. This phenomenon takes place continuously at all positions over the whole area of the apertured supports. Consequently, there is a continuous well-controlled rate of feed of batch to the furnace. Moreover, this feed rate is not dependent on the maintenance of a constant rate of delivery of batch material onto the apertured supports.

Yet another important advantage of the invention is a very efficient utilization of heat supplied by the furnace gases for pre-heating the vitrifiable batch. This good heat recovery is dependent on the fact that each support for batch material is exposed to the gases, and on the apertured form of such support. Batch material does not descend through a support aperture until the material is at least partially molten, and when the material does so descend it does so gradually and forms, as its viscosity decreases, a suspended drop or bead which depends from the support and is consequently enveloped by hot furnace gases. There is thus a large aggregate surface contact area between the melting batch material and the hot gases and this provides a condition which is favorable to a large heat transfer coefficient.

It is also notable that a process according to the invention is applicable with batches of various physical states, e.g., powder, granules, pellets, agglomerates.

In the foregoing definition of the invention the condition of the batch material as it flows through the support apertures is described as molten or partly molten. A vitrifiable batch contains a mixture of constituents having different melting temperatures or ranges. Generally speaking, if the lower melting constituents in any given batch portion which is retained by an apertured support are brought to a molten condition, that suffices to render that batch portion flowable so that it can pass through the support apertures. However, it is also possible when carrying out the invention to heat a supported quantity of batch material to such an extent and so rapidly that substantially the whole mass thereof is in molten state as it flows through the support apertures.

Preferably, batch material is temporarily retained by a plurality of such apertured supports located at different levels, and at least part of the batch material flows through two or more supports, one after another, before reaching the furnace. When proceeding in that way a relatively large proportion of the heat content of hot furnace gases is used for pre-heating batch material. However, a higher feed rate of molten or partially molten batch material to the furnace can be achieved.

Advantageously, at least a part of the hot furnace gases is caused to flow upwardly past and in contact with batch material supported on the support. In these circumstances the surface area of the supported batch material which is in close heat-exchange relationship to the hot gases from the furnace is larger. Consequently, there can be a greater useful heat recovery and a more rapid pre-heating of the batch material to a required temperature.

In certain embodiments of the invention, which are favored because of the efficient utilization of the heat content of the hot furnace gases, batch material is temporarily retained by a plurality of apertured supports disposed at different levels and in staggered relationship so that (in plan view) they overlap. At least a part of the hot furnace gases is caused to flow upwardly along an undulating path past and in contact with batch material on such apertured supports. In such processes, not only is there a feed of some molten or partially molten batch material from one support onto another, but also there is a relatively large contact surface area between the hot gas stream and each of the supported quantities of batch material so that the advantages associated with both of these conditions are realized.

The invention includes processes wherein at least part of the batch is at least partially melted while in the upper layers of a heap of batch material on an apertured support. By so heating the supported batch material that it already becomes at least partially molten while it is in such upper layers, a higher feed rate of batch material through a given apertured support area can be achieved. Advantageously, at least part of the hot furnace gases is caused to flow across and in contact with the top of a heap of batch material on an apertured support. In that case, hot combustion gases from the furnace are used for raising the temperature of batch material in upper layers of a supported heap and thus contribute to shortening the pre-heating time and increasing the feed rate of batch material through the support.

In some processes according to the invention, and in which hot furnace gases are conducted in heat-exchange relation to the upper layers of a supported heap of batch material as aforesaid, at least part of the hot gases is caused first to flow across and in contact with the bottom of an apertured support, and then to flow across and in contact with the top of the supported heap of batch material. This feature is favored because it is conducive to a very good heat recovery from any given part of the hot gases used for the pre-heating of batch material.

The invention includes processes wherein the apertured supports are heated in part by heat transferred thereto from the hot furnace gases and in part by heat generated directly in the support by another energy source. By virtue of such a supplementary heat supply the amount of vitrifiable batch material which is pre-melted in a given time can be increased and/or the extent to which its viscosity is lowered, prior to entry into the furnace, can be increased. By way of example, a fluid heating medium can be circulated through an apertured support for increasing the amount of heat radiated from such support to the supported batch material.

In preferred embodiments, using supplementary heating, batch material while retained by an apertured support is heated in part by heat transferred thereto from the hot furnace gases and in part by heat generated directly in such supported material by another energy source. The degree of pre-melting of the batch material and/or the feed rate of molten or partly molten material to the furnace can be significantly increased for a relatively low additional energy consumption if the energy is supplied within the mass of supported batch material.

Particular importance is attached to processes according to the invention, wherein electric current is passed through supported batch material so that heat is generated therein by Joule effect. The advantages hereinbefore referred to, associated with the use of a heat source supplementary to the furnace gases, is particularly in evidence when using this electrical heating technique. It has been found possible, by using such a technique, to at least triple the amount of batch material melted per unit of time.

Preferably, the batch is fed onto an apertured support in agglomerated condition. By an agglomerated condition is meant a condition in which the individual pieces or particles of the batch themselves comprise smaller particles or pieces which cohere or are bonded together, in whatever manner. Thus, the agglomeration may be due, e.g., to sintering or to the bonding of elementary batch particles together by means of a bonding agent, thereby to form pellets, granules, wafers or bodies of some other physical form. A specific example is pellets of ovoid form comprising agglomerated particles and having a mean diameter of approximately 70 mm. Another example is granules of the order of from 10 to 20 mm. The term "granules" denotes irregularly shaped bodies. A third example is wafers having a thickness of a few millimeters and length and breadth dimensions of some centimeters. In carrying out the present invention it is preferable for the batch fed to the apertured supports for pre-heating to be in the form of agglomerated pieces, preferably granules. In an agglomerating operation, elementary particles of batch ingredients are compacted together and this considerably assists the subsequent heating of the batch material by heat exchange to bring about its melting or partial melting. Moreover, the agglomerating helps to preserve the uniformity of the batch composition during handling of the batch prior to, during and after feeding thereof to the apertured supports on which it is pre-heated. Agglomerating also ensures that very fine vitrifiable substances are not entrained by the hot combustion gases from the furnace.

Considerable advantages can be realized by subjecting the batch material to some heating prior to feeding it to the apertured supports. In certain recommended processes the batch is brought to a temperature above 600° C. before being fed to such supports. Such preliminary heating can be carried out in a heating zone distinct from that in which the pre-heating process whereby the batch material is wholly or partially melted is performed. Consequently, the conditions obtaining in that preliminary heating zone, in respect of the disposition of the batch material in relation to the heat source and in other respects, can be chosen with due regard to the physical condition of the batch material over the temperature range prevailing in that preliminary zone so as to optimize the efficiency of heat utilization.

It is very satisfactory when the batch material is in agglomerated form, e.g., in the form of granules, to heat such batch material in a preliminary heating zone by passing hot furnace gases through layers of the batch material. Such preliminary heating can be continued up to a temperature just below that at which the granules would commence to cohere and thus become difficult to feed in a proper manner to the next pre-heating stage.

Preliminary heating temperatures above 600° C., and even above 700° C., are often appropriate, for example in the case of batches for manufacturing soda-lime glasses such as are used in the manufacture of flat glass using a glass-melting tank furnace.

The process according to the invention has been devised more particularly from the melting or partial melting of soda-lime glass batches. However, the process can be employed in the pre-heating of other vitrifiable batches.

The invention includes apparatus for use in pre-heating a vitrifiable batch prior to its introduction into a glass-melting furnace. Thus, the invention includes apparatus comprising a feed shaft into which vitrifiable batch can be fed and which also provides a flow path for hot gases escaping from the furnace. At least one support for temporarily supporting batch material while heat is transferred to it from such hot gases is disposed in the shaft. There is at least one support which is of apertured form and which is disposed so that its bottom side forms part of the boundary of the gas flow path, and so that between such support and the inner surface of the shaft there is a gap via which such gases can flow upwardly past and in contact with such support.

Such apparatus, as can be deduced from the foregoing description of the pre-heating processes according to the invention, affords important advantages. Here it should suffice to emphasize that the apparatus makes it possible for batch material to be fed in a predetermined molten or partly molten condition and at a properly controlled rate, to a glass-melting furnace. This is due in part to the provision of a batch material support or supports which are capable of holding a quantity or quantities of batch material so long as that material is in solid condition, but allows the material to pass through the support once the material has been brought to a flowable condition in which it can pass through the support apertures by melting or partial melting. Another factor which enables the apparatus to provide the specified results is that the hot furnace gases have access to the bottom of each apertured support and are able to envelop the individual quantities of molten or partially molten batch material descending from the support apertures. In addition, as the gases flow upwardly past and in contact with the apertured support they can also make heat-exchange contact with the supported heap of material at one or more sides of such heap and thereby further assist in the required pre-heating of the batch material. One or more guide walls may be provided for guiding or deflecting hot gases towards the top of a heap of batch material when present on the support.

The invention also includes pre-heating apparatus comprising a feed shaft into which vitrifiable batch can be fed. At least one support for temporarily supporting batch material is disposed in the shaft. There is at least one support which is of apertured form and which is formed by or associated with heating means for heating batch material on such support to bring such material to a flowable condition in which it can flow downwardly through the support apertures. Such heating means includes electrodes between which an electric current can be passed for generating heat in the supported batch material by Joule effect.

As hereinbefore explained, the provision of supplementary heating means in the form of electrodes via which electric current can be passed through the supported batch material enables pre-melting of supported batch materials to be very rapidly and easily achieved. In such an apparatus it is advantageous, for reasons already stated, for there to be, between an apertured support and the inner surface of the shaft, a gap via which hot gases can flow upwardly past and in contact with such support.

When electrodes are used as aforesaid for generating heat within a supported heap of batch material, the electrodes should preferably be disposed only a short distance above the apertured support level. Preferably, the distance is 10 cm or less. The electrodes may be made of a refractory metal or alloy. It is suitable to provide at least one pair of electrodes which are disposed so as to intrude into a supported heap of batch material from opposite sides thereof, the inner ends of the opposed electrodes being spaced by a few centimeters. The electrodes are connected to a voltage source the output of which depends, inter alia, on the electrical conductivity of the vitrifiable composition in the zone where the electrodes are located, and on the electrode spacing.

When electrodes are used for electrically heating batch material the degree and/or rate of pre-melting can be controlled by regulating the electric power supply to the electrodes. Any electrode arrangement alternative to that described can be employed, still with the aim of achieving a substantially uniform distribution of supplementary heat throughout the volume of the supported batch material.

The shaft of a pre-heating apparatus according to the invention is preferably a vertical shaft wherein premelted batch can fall vertically from the apertured supports either directly into a glass-melting tank or to a receiving zone at the bottom of the shaft from which such batch can flow along an inclined surface into a glass-melting tank. The shaft walls are preferably made of refractory material such as refractory heat-insulated bricks.

Preferably, there is at least one apertured support which has a retaining wall, bordering the gap for the upward flow of gases, for retaining a heap of batch material on the support. Such a retaining wall enables taller heaps of material to be retained on the support preparatory to pre-melting and thus allows greater latitude in the continuity and/or rate of feed of batch material into the shaft for maintaining a continuous feed of batch material to the furnace.

In some apparatus according to the invention there is provided, in the vicinity of an apertured support, a passageway for hot furnace gases which leads out of the shaft near the bottom of that support and back into the shaft at a position such that gases leaving that passageway will be directed across and in contact with batch material on the support. By providing such an external passageway the advantage of conveying hot gases first in contact with the apertured support and then in contact with the top of the supported heap of batch material is realized without reducing the effective cross-section of the shaft. In other words, the support can extend over the whole of such cross-section. The passageway can be heat-insulated to reduce heat loss from the hot gases passing therethrough.

Advantageously, means is provided for directly generating heat in an apertured support. Makeup or supplementary heat, however supplied, contributes to acceleration of the pre-melting operation. Supply of supplementary heat via the support itself is a very convenient way of achieving this advantage. By way of example, the apertured support can be formed by tubes through which fluid heating medium can be passed. This fluid medium may, e.g., be combustion gases from the furnace.

Apparatus according to the invention may incorporate supplementary heating means of a kind or having a location alternative to those above described, e.g., one or more electrical resistance heaters or heating tubes, or one or more gas or liquid fuel burners disposed at a level above or below an apertured support.

Preferably, there is at least one apertured support which extends over the entire cross-section of the shaft. The whole shaft cross-section is then utilized for supplying batch material in pre-melted condition. This is favorable for ensuring a good feed distribution to the furnace.

In certain very satisfactory apparatus according to the invention there is a plurality of apertured supports located at different levels and staggered relationship in the shaft, so that the supports define an undulating path for hot gases escaping from said furnace with each other and with the inner surface of the shaft. This type of apparatus provides a very efficient heat-exchange and a well distributed feed of pre-melted batch material.

Preferably, there is at least one apertured support which is disposed horizontally. This is the most suitable orientation both for retaining a heap of batch material and for ensuring a substantially uniform flow of pre-melted batch material through the support over its whole area. A horizontal disposition is particularly recommended for a support located in a bottom part of the shaft. Other supports, if any, can be disposed at an inclination to the horizontal, or horizontally.

Preferably, there is at least one apertured support formed by spaced bars. Such a support is better able to withstand the high temperature conditions in the shaft. Such bars may be solid or they may be hollow, i.e., of tubular form, and may be of round, square or any other desired cross-sectional shape. Suitable refractory materials for the bars are, e.g., refractory metals, silico-alumina refractories such as those prepared by electrofusing and combinations of such refractory materials. Usually it is suitable to employ bars having a diameter or width of several centimeters. The bars can have a protective coating providing enhanced resistance to heat and chemical attack under the severe conditions prevailing in the shaft. The bars may be rotatably mounted so that they can be individually rotated about their axes.

Preferably, there is at least one support formed by spaced hollow bars and means is provided for circulating cooling medium through such bars. By internally cooling the bars their working life can be increased. A liquid or gaseous medium can be used as cooling medium. Gas cooling is preferred in order not to withdraw too much of the heat supplied for pre-melting the batch material.

Advantageously there is at least one support which is formed by bars with a between-bar spacing greater than 10 mm. This is the preferred minimum spacing for obtaining a satisfactory flow rate of pre-melted material through the support but the actual spacing selected for any given apparatus depends, inter alia, on the nature of the batch to be handled, particularly on the size of the batch pieces or particles, but also on the viscosity of the batch material at the temperature to which it will be raised while on the support.

The invention includes apparatus wherein there are two or more supports formed by spaced bars and located at different levels so that batch material can feed through one support onto another, and there are supports at different levels which have different between-bar spacings. The choice of different between-bar spacings for different levels is a manner of achieving substantially the same flow rate of pre-melted material through supports at different levels notwithstanding differences between the temperatures and therefore the viscosities of the batch material at these different levels. The between-bar spacings can be chosen to compensate for this factor. A decrease in spacing from the top support to the bottom supports is often desirable for this purpose.

The apparatus, according to certain embodiments thereof, includes means in the form of a variable-delivery vibrating distributor for feeding vitrifiable batch into the shaft. Such feed means may comprise vibrating plates or other bodies. A vibratory action is particularly useful if the condition of the batch material prior to entry into the shaft is such that the batch particles or pieces tend to stick together with the result of an irregular feed into the shaft. By providing control means for varying the vibration rate the feed rate can be effectively controlled.

Preferably, there is an inclined chute for guiding batch material from the bottom of the shaft into a glass-melting tank furnace. Such chute may be connected to the melting end of the furnace so that the pre-melted batch flows by gravity down the chute and directly onto the surface of the bath of molten glass in the tank. Hot furnace gases can be directed upwardly along the chute and into the shaft through an opening in the shaft wall, from which opening the gases then rise in counter-current to the descending pre-heated batch material. The gases in this case also serve by heat exchange to heat the pre-melted batch material as it descends along the chute and enters the furnace.

DESCRIPTION OF THE PREFERRED EMBODIMENTS

Figure 1:
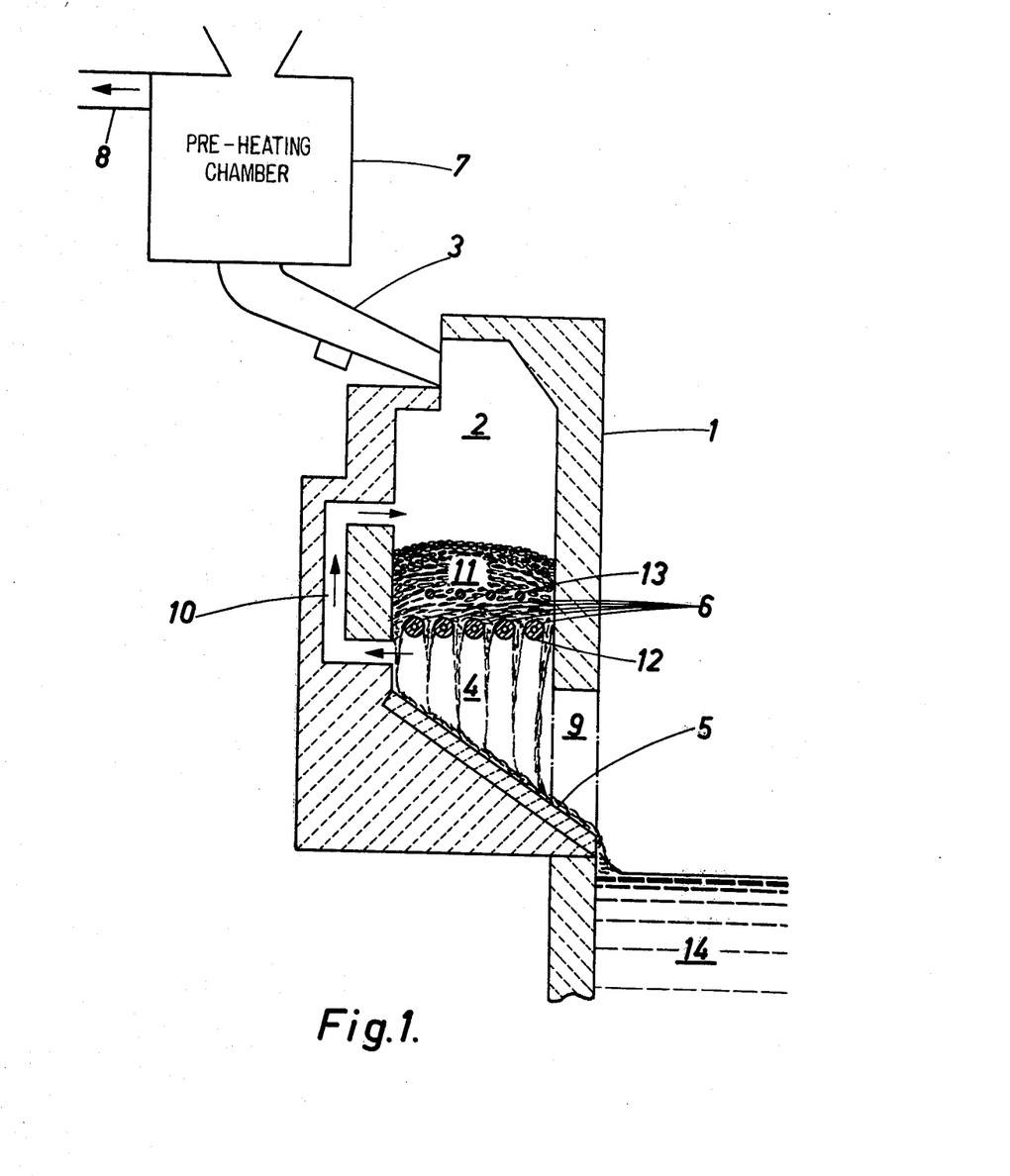
FIG. 1 is a vertical cross-sectional view of a first embodiment of the present invention.

The apparatus represented in FIG. 1 includes a vertical shaft 1, the upper part 2 of which is connected to a vibrating chute 3 via which vitrifiable batch is fed into the shaft. The bottom part 4 of the shaft has an inclined bottom surface 5 along which vitrifiable batch material 11, after being brought to an at least partially melted condition, discharges from the shaft. The batch material 11 fed into the shaft forms a heap on a horizontal apertured support 6.

The batch entering the shaft from the chute 3 is in the form of grains. The grains are prepared by agglomeration of the batch constituents in an agglomerating apparatus (not shown) of known type. The grains are then fed through the hopper inlet of a preliminary stage pre-heating chamber 7 in which the grains are brought to a temperature of approximately 650° C. before discharging from the bottom of this chamber onto the chute 3.

In the illustrated embodiment the pre-heating of the batch in chamber 7 is effected by heat transfer from hot furnace gases which escape from the upper part 2 of the shaft 1 and flow upwardly along chute 3 and the chamber 7 in counter-current to the descending grains. The gases eventually leave the chamber 7 via a gas outlet pipe 8. By way of modification, the heating of the grains in the chamber 7 could be effected by gas burners or other heating devices.

The further pre-heating of the batch material in the shaft 1, in accordance with the present invention, takes place in part by heat transfer from hot gases which enter the shaft 1 via a bottom opening 9 from the melting chamber of a glass-melting tank furnace. The temperature of these gases on entry into the shaft 1 is approximately 1350° C. These furnace gases enter the bottom part 4 of the shaft 1 and flow into contact with the apertured support 6 which supports the granular batch material 11. The shaft is provided with one or more by-pass passageways 10 via which the hot gases flow out of the shaft proper from a position immediately beneath the apertured support and then back into the shaft at a position near the top of the heap of batch material 11. The combustion gases from the glass-melting furnace therefore heat the heap of material 11 from below and from above and there is a large transfer of heat to this heap of material resulting in at least partial melting of batch material both at the bottom and in upper layers of the heap.

In the illustrated apparatus the flow of hot furnace gases through the shaft 1 is by natural draft. If desired provision could be made for supplementing the natural draft effect by artificial means.

The apertured support 6 is formed by spaced parallel tubes 12 of circular cross-section. The individual tubes are 86 mm in diameter and include a refractory steel core enclosed by a sheath of a silico-alumina substance. The tubes are cooled internally by air flow. The width of the gaps between the tubes is approximately 15 mm.

The apparatus further includes a system of electrodes such as 13 which are located so as to intrude horizontally into the heap of batch material 11 at a level which is a few centimeters above the apertured support 6. The electrodes 13 are bars of approximately 33 mm diameter, made of a refractory steel or alloy. The electrodes are arranged in two series (one of which is shown) which intrude into the heap of batch material from opposite sides of the shaft. The opposed series of electrodes are connected to a voltage source (not shown) providing for a power supply of up to 0.12 Kw per Kg of batch passing between the electrodes per hour.

When the shaft 1 is initially charged with batch material, it is heated solely by heat transfer from the hot furnace gases. The temperature of the batch material 11 at the bottom of the heap is raised by this heat transfer to such an extent that the material adjacent the apertured support 6 becomes at least partially molten and commences to flow downwardly between the tubes 12, forming depending drops or beads which become progressively larger and therefore present a progressively increasing surface area in direct contact with the hot furnace gases flowing along the underside of the apertured support. This descending batch material becomes progressively less viscous and eventually falls in streams onto the inclined bottom surface 5 of the shaft, from which surface the material flows into the bath 14 of molten glass in the glass-melting furnace. Once this condition has been established, the feed of solid batch material into the shaft 1 and the flow of molten or partially molten batch material from the apertured support 6 can proceed continuously. The pre-heated condition of the different streams of batch material flowing downwardly from the support 6 is substantially the same for all the streams and remains substantially constant in course of time. Moreover, the feed of batch material is well distributed over the whole of the bottom surface 5 of the shaft and therefore across the full width of the opening 9 leading to the furnace.

Once a vitreous phase or phases has or have been formed in the batch material above the support 6, electric current can pass through this material between the electrodes 13 so that additional heat is generated within the heap of material 11 by Joule effect. This supplementary heating helps appreciably to increase the rate of flow of molten material from the apertured support. Moreover, the flow rate can be very flexibly controlled by regulating the electric power supplied to the electrodes.

The stable supply of material to the furnace from the apertured support 6 at a rate which can be nicely controlled, enables the feed of batch to the furnace to be mantained without interruption.

By way of example, the rate of flow of partially melted batch material may be 200 kg/h/m$^2$ of cross-sectional area of the shaft 1 without supplementary heating by means of the electrodes, and 600 kg/h/m$^2$ when such supplementary heating is applied.

Figure 2:
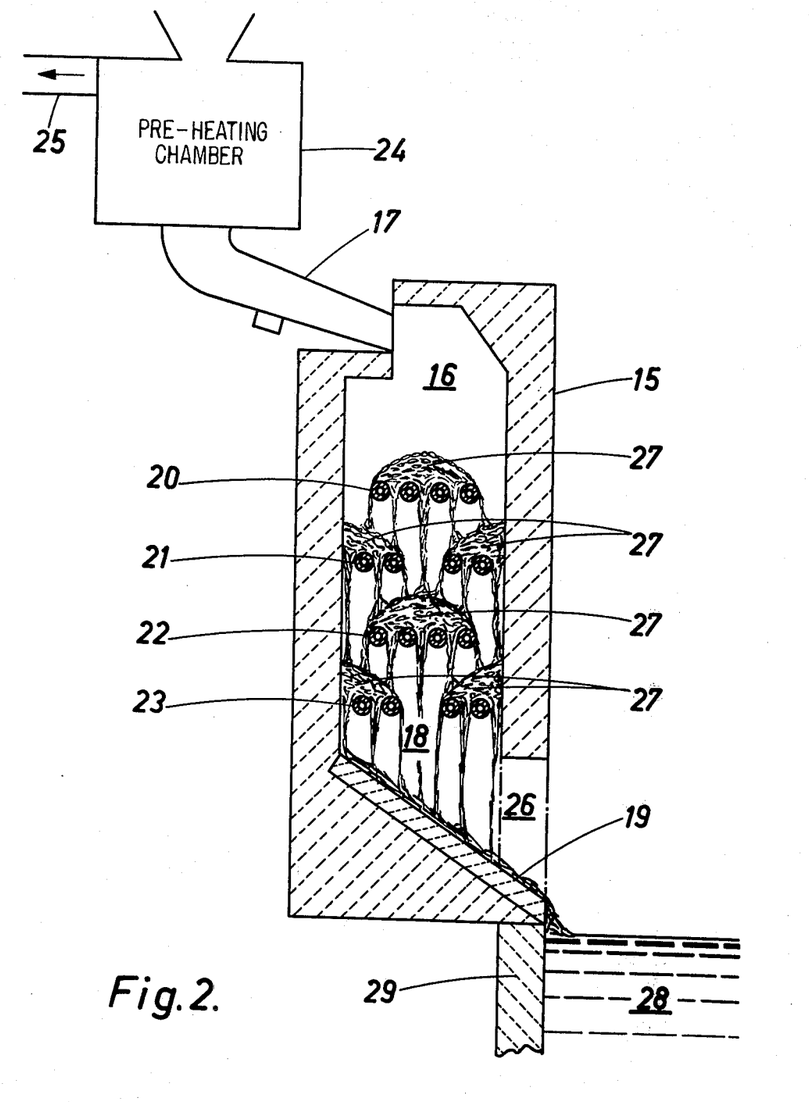
FIG. 2 is a vertical cross-sectional view of another embodiment with supports at different levels.

Reference is now made to the embodiment of the invention shown in FIG. 2. This apparatus includes a vertical shaft 15 similar to the shaft 1 in the FIG. 1 apparatus. The upper part 16 of the shaft is fed with vitrifiable batch via a chute 17 which is vibrated to improve the continuity of the batch supply. The bottom part 18 of the shaft has an inclined bottom surface 19 along which molten or partly molten vitrifiable batch material discharges from the shaft.

Within the shaft there are four apertured supports 20–23 in the form of gratings, disposed at different levels. Each grating is formed by spaced parallel air-cooled tubes 86 mm in diameter, the width of the between-bar spacing being 17.5 mm. The top grating 20 occupies a central part of the front-to-rear internal dimension of the chamber (measured in the plane of the drawing), as does also the grating 22. Each of the gratings 21 and 23 comprises two sections respectively set against the front and rear walls of the shaft, there being ample space between these sections to allow for the free fall of molten or partly molten batch material from the central grating at the next higher grating level. It will be apparent that in plan aspect there is an overlap of gratings disposed at different levels. The gratings together cover the full cross-sectional area of the shaft. Any batch material which discharges over boundaries of the gratings 20–22 falls onto a heap of batch material retained by an underlying grating.

The vitrifiable batch material which enters the upper part 16 of the shaft is in the form of granules which are formed by a granule forming apparatus (not shown) of known form and which are then fed through the hopper entrance of a chamber 24 in which the granules are subjected to a preliminary pre-heating by heat transfer from hot gases which escape from the shaft 1 and flow upwardly through chute 17 and chamber 24 before being evacuated via the outlet pipe 25. The granules are heated in the chamber 24 to a temperature of 650° C.

The batch material is further pre-heated in shaft 15 by heat transfer from hot gases which are conducted into the shaft from the glass-melting furnace via a bottom opening 26. These hot gases rise along undulating or zig-zag paths which extend between the two sections of grating 23, around the grating 22, between the grating section 21 and then around the top grating 20. In the course of this flow the hot gases directly contact the undersides of the gratings and the heaps 27 of batch material supported thereby, and also the top layers of batch material in such heaps. There is therefore a very effective heat transfer from the gases to the supported quantities of batch material.

If the batch material on the top grating 20 is sufficiently heated to cause a continuous flow of batch material in molten or partially molten condition through that grating, the rate of feed of granules into the shaft can be adjusted so that substantially all of this infed material is caught by and then flows through that grating. However, if the material on grating 20 is not heated sufficiently to cause a flow of this material through that grating, or if such flow occurs but is at a rate less than the rate of feed of granules into the shaft, granules will accumulate on the grating 20 and form a heap having natural slopes along which granules entering the shaft descend so as to fall onto the grating 21. Discharge of batch material from this grating 21 may take place through this grating and/or over the boundaries of its component sections, depending on the temperature to which material on this grating is raised. In all cases, however, the batch material falling onto the bottom inclined surface 19 is in molten, or partially molten, condition and is material which flows directly onto such surface through the gratings 22 and 23.

The maximum rate of supply of molten or partially molten batch material to the furnace which can be achieved with apparatus of the kind shown in FIG. 2 depends in part on the number of gratings and the number of levels at which gratings are provided, within the shaft. By increasing such number and thereby increasing the total surface area of contact between the hot furnace gases and the heaped batch material, the rate of feed of molten or partially molten material to the furnace can be increased.

In an actual process performed in the apparatus shown in FIG. 2 it was possible to achieve a rate of flow of molten or partially molten material of 700 kg/h/m$^2$ of shaft cross-section without supplementary heating.

In the illustrated embodiment, the batch material flows from the bottom surface 19 of the shaft directly onto the surface of a bath of molten glass 28 in the melting chamber of a furnace having a wall 29 to which the feed apparatus according to the invention is connected.

Figure 3:
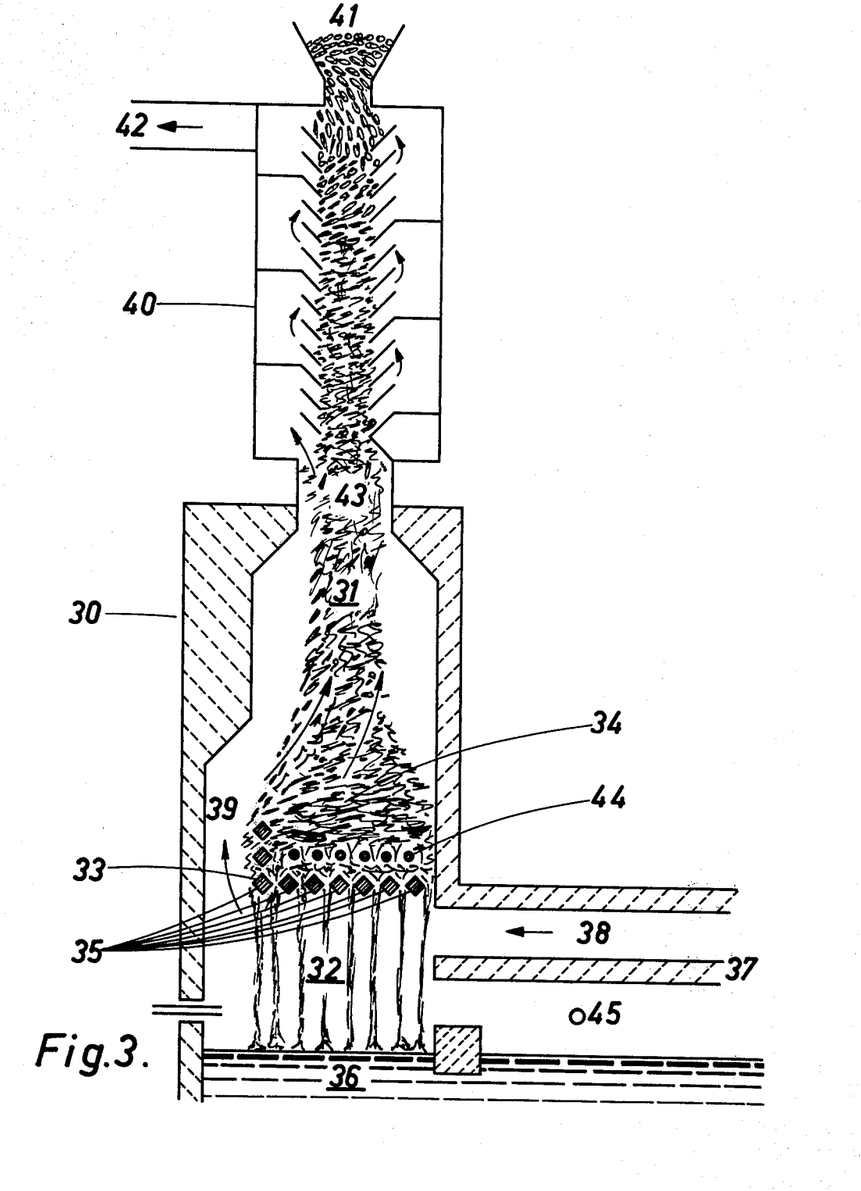
FIG. 3 is a vertical cross-sectional view of a further embodiment.

Reference is now made to FIG. 3. The apparatus shown in that figure comprises a shaft 30 with refractory walls and having a lower part 32 which is of larger cross-section than its upper part 31. In the lower part 32 there is a grating support in the form of a trough 33 for receiving vitrifiable batch material 34 to be premelted. This batch material is at least partially premelted and flows in pasty or very viscous state between the bars 35 of the grating and falls onto a quantity of molten glass 36 held in a fore-part of a glass-melting furnace 37.

Hot gases 38 are conducted from the glass-melting furnace into the lower part 32 of the shaft 30 where such gases directly contact the bars 35 forming the horizontal floor of the trough 33 and also directly contact the molten or partially molten batch material flowing downwardly between those bars. The hot gases flow upwardly as indicated at 39, between the trough 33 and the rear wall of the shaft 30 and then flow inwardly over the top of the heap 34 of batch material supported by the trough, before rising through the upper part of the shaft.

The pre-heating shaft 30 is surmounted by a louvered heat exchanger 40, as known per se, into which the batch material is fed via a filling hopper 41. The batch material is subjected to a preliminary heating in this heat exchanger by heat transfer from the gases which leave the shaft 30 and flow in counter-current to the material in the heat exchanger before discharging via the exhaust pipe 42.

In the heat exchanger 40 the batch material is heated to a temperature of about 600° C., at which temperature the batch material is still in solid condition. The thus pre-heated solid batch material falls through the throat connection 43 between the shaft 30 and the heat exchanger 40 and onto the heap 34.

This preliminary heating is valuable from the point of view of heat economy because it makes use of a further part of the heat content of the furnace gases. The preliminary heating has the further advantage of facilitating the following pre-heating stage in the shaft 30.

The trough 33 has a width of 1.05 m. The width of the passage 39 between the trough 33 and the rear wall of the shaft is about 25 cm.

The trough bars 35 are of square section and are disposed with their diagonal planes vertical and horizontal. Each bar is 75 mm square in section (diagonal dimension 96 mm) and the between-bar spacing at its narrowest point is 30 mm. The bars 35 are made of a zirconia based refractory material commercially known as "Zac" (Trademark). Zac is an electrocast refractory based on alumina, silica and zirconia produced by "Société Européenne des Produits Réfractaires" France. Such bars have a high resistance to oxidation and to corrosion by the batch material at high temperature.

The vertical sill or retaining wall of the trough serves to retain a heap of batch material of about 40 cm. in height. The provision of such a retaining wall is advantageous because is enables a taller heap of batch material to be retained for progressive pre-melting as the batch material descends towards the bottom of the apertured support.

The apparatus includes electrodes 44 which intrude into the heap 34 at a level about 70 mm above the bottom bars 35. These electrodes are made of a refractory metal (molybdenum with a protective layer of $MoSi_2$) and have a diameter of 33 mm. The electrodes are arranged in two opposed series (one of which is shown) which intrude into the batch material from opposite sides of the shaft. The opposed series of electrodes are connected to a voltage source (not shown) developing 25 Kw.

For greatest effectiveness, the electrodes should be placed in the vicinity of the bottom bars 35, near the bottom of the heap 34, which is the region where liquid phases, favorable to the passage of electric current through the batch material, are predominantly formed.

The temperature of the hot furnace gases under the trough 33 is approximately 1350°C., which is sufficient for bringing the batch material to a temperature between 1100° and 1150° C., at which it is substantially entirely in molten condition, before such material falls from the trough into the bath 36. Gas or liquid fuel burners such as 45 serve to maintain the required temperature of the glass in the melting chamber of the furnace. If desired, one or more such burners can be provided above the bath 36 in the fore-part of the furnace in order to accelerate the complete melting of the batch material flowing through the trough 33.

Figure 4:
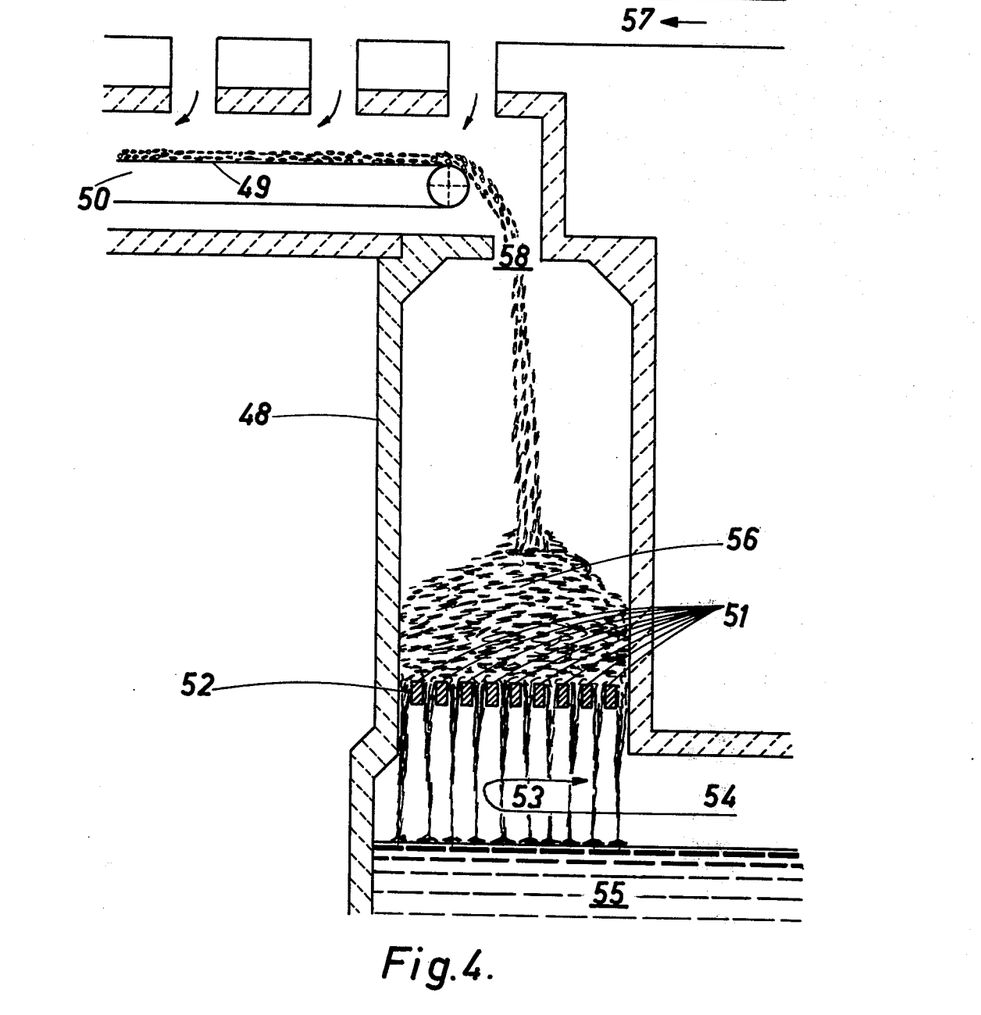
FIG. 4 is a vertical cross-sectional view of a still further embodiment of the invention.

Now referring to FIG. 4, there is shown an apparatus comprising a vertical pre-heating shaft 48 into the top of which a vitrifiable batch in the form of granules is fed.

These granules are fed into the shaft by a distributing conveyor 49 extending through a chamber 50 in which the granules are heated at a temperature of the order of 600° C.

The heat required is supplied at least in part by hot gases which are fed into the chamber 50 via a conduit 57.

The shaft 48 is equipped in the lower portion thereof with a series of spaced parallel bars 51 forming an apertured support 52, actually a grating, which occupies the whole of the interior cross-section of the shaft. The bars 51 are of rectangular section and are oriented with their longer sectional dimension vertical. The between-bar spacing is 20 mm.

Immediately beneath the grating 52 the pre-heating shaft communicates with a space 53 within the entry end of a glass-melting furnace 54 holding a bath of molten glass 55 which extends beneath the pre-heating shaft. Hot gases in the furnace circulate in the space above the molten glass bath and thus pass through the space 53 in direct contact with the grating. There is no exhaust passage for these gases.

The batch granules fed into the pre-heating shaft 48 form a heap 56, about 50 cm in height, on the grating 52. The material in the lower layers of this heap become heated by heat transfer from the hot gases in the space 53 to such an extent that such material becomes partially melted and forms a pasty mass which flows downwardly between the bars 51. The material flowing between the bars becomes further heated and progressively less viscous and pours onto the surface of the molten glass bath 55.

In one apparatus according to FIG. 4 the grating bars 51 were composed of a molybdenum core with a $MoSi_2$ protective coating enclosed by a sheath of a stainless steel known as AISI 310 described in "Metals Reference Book" Colin and Smithells, London, 1962. These bars constituted two series of electrodes connected to opposite poles of a voltage source developing about 130 V. The two series were disposed with the bar-electrodes of one series alternating with bar-electrodes of the other series along the grating. Due to the vertical orientation of the bar sections and their close spacing there is a large field area for the passage of electric current through batch material located between the bars in that apparatus. The period of time during which any given increment of batch material is in this field is sufficient for that material to become considerably hotter and less viscous than when the electrical heating is omitted and reliance is placed entirely on heat transfer from the gases circulating beneath the grating. In the actual example referred to, employing the electrodes, the batch material was brought to a temperature of 1100° C. in the vicinity of the grating.

The spacing between the bars can be modified in course of use of the apparatus according to the degree of pre-melting required. The bars can be easily replaced when they have become worn or corroded by long contact with molten glass.

It is within the scope of the invention to employ two or more superposed layers of electrodes in the grating, or to provide supplementary electrodes at one or more levels above the grating and within the heap of batch material thereon. In the latter case it is preferably for the supplementary electrodes to be located at only a short distance, e.g., less than 10 cm above the grating.

The passage of electric current through batch material is dependent on the formation of a vitreous phase or phases between the electrodes. That condition can be brought about solely by heating of the batch material by heat transfer from the furnace gases and/or by heat supplied by one or more gas or liquid fuel burners disposed in the space 53 and/or at a position or positions in the shaft 48 above the heap of material 56. Such burners, if used, can be withdrawn or extinguished once the conditions necessary to the operation of the electrodes has become established.

The following are specific examples of the performance of a process according to the invention.

EXAMPLE 1

A pre-heating apparatus as represented in FIG. 1 and connected as shown to the melting end of a glass-melting tank furnace, included a vertical shaft having a height of 2 m and a cross-sectional area of 0.27 m². The shaft was formed of refractory bricks. The grating for supporting the batch material pre-heated in the shaft was composed of spaced circular-section bars composed of electro-fused refractory material based on zirconia as is well known for the construction of refractory linings of glass-melting furnaces. The bars were arranged with a between-bar spacing of 15 mm. Their diameter was 86 mm.

The furnace was employed for melting a soda-lima glass batch and the temperature of the molten glass in the furnace tank at its melting end was 1500° C. Hot combustion gases from the furnace entered the bottom of the pre-heating shaft at a rate of 60 m$^3$ (NTP)* per hour. The temperature of these gases at a position immediately beneath the grating was 1330° C.

* NTP : Normal Temperature and Pressure.

Batch of a conventional chemical composition for ordinary soda-lime glass manufacture was fed into the top of the pre-heating shaft. The batch was in the form of granules in the size range 10 to 20 mm. The granules entered the pre-heating shaft at a temperature of 650° C.

The granules were fed into the shaft so as to establish a heap approximately 40 cm in height on the grating. At a position just above the top of this heap the furnace gases in the shaft were at a temperature of 1100° to 1250° C. The initially formed heap of the batch material was heated in part by heat transfer from the hot furnace gases and in part by fuel burners (not shown) which were introduced into the shaft just above the heap of batch material. Once a substantially uniform flow of molten batch material through the grating occurred, the burners were withdrawn and granules were fed into the shaft continuously at a controlled rate to maintain the height of the top of the heap on the grating substantially at a constant level.

The batch material flowing through the grating remained of a substantially constant composition, containing the different batch ingredients in the required proportions. This material flowing through the grating was about 80 percent by weight a viscous liquid phase and about 20 percent by weight quartz grains dispersed in that liquid phase. This partially molten material had a temperature of 1150° C., and the rate of flow of this material into the tank furnace was 48 Kg per hour.

Tests showed that a continuous flow of batch material through the grating (although at a reduced rate) would take place even if the solid phase content of such material were up to about 50 percent by weight.

EXAMPLE 2

A process was performed as described in Example 1 but the heating of the batch material on the grating was continuously assisted by passing electric current through the batch material between opposed series of electrodes disposed at a level approximately 10 cm above the grating, the electrodes of each pair being at a mutual spacing of about 70 mm. Electric power of 25 Kw was supplied to the series of electrodes at 130 V. Due to this supplementary heating, the rate of flow of batch material through the grating was higher than in Example 1, the flow rate being in fact 190 Kg per hour, and the rate of feed of batch granules into the shaft was correspondingly higher than the feed rate in Example 1.

EXAMPLE 3

Apparatus as represented in FIG. 2 was used, including a vertical pre-heating shaft 2 m in height and having a cross-sectional area of 0.27 m$^2$. The gratings at the four different levels were formed by spaced parallel air-cooled tubes 86 mm in diameter. The between-bar spacing of the gratings differed. The between-bar spacing of the top grating was 20 mm and that of the bottom grating 17.5 mm. The vertical distance between the gratings at the different levels was 30 cm.

The pre-heating shaft was supplied with batch in the form of granules in the size range 8 to 15 mm, the granules having a temperature of 650° C on entry into the pre-heating shaft. The feed rate of batch into the shaft was 192 Kg/hr. Hot combustion gases from the glass-melting furnace entered the bottom of the pre-heating shaft at a volume rate of 55 m$^3$ (NTP) per hour and at a temperature of 1317° C. The temperature of the hot gases at a level above the top grating was 1099° C.

The partially melted batch falling to the foot of the shaft had a temperature of 1100° C and was about 80 percent by weight a viscous liquid phase and about 20 percent by weight quartz grains dispersed in that liquid phase.

It will be understood that the above description of the present invention is susceptible to various modifications, changes and adaptations, and the same are intended to be comprehended within the meaning and range of equivalents of the appended claims.

We claim:

1. A process for pre-heating a vitrifiable batch prior to its introduction into a glass-melting furnace using hot gases from the melting furnace, comprising directly exposing at least one support including a plurality of spaced bars to gases from the furnace, feeding at least part of the batch onto the support, temporarily retaining batch material by such support, and heating batch material on the support until it is in at least a partly molten condition in which it flows through the spaces between bars.

2. A process as defined in claim 1 wherein during the step of retaining, batch material is temporarily retained by a plurality of supports including a plurality of spaced bars, the supports being located at different levels, and at least part of the batch material flows through at least two such supports, one after another, before reaching the furnace.

3. A process as defined in claim 1 comprising directing at least a part of the hot furnace gases to flow upwardly past and in contact with batch material on the support.

4. A process as defined in claim 3 wherein during the step of retaining, batch material is temporarily retained by a plurality of supports including a plurality of spaced bars, the supports being disposed at different levels and in staggered relationship so that, as considered in plan view, they overlap, and comprising directing at least a part of the hot furnace gases to flow upwardly along an undulating path past and in contact with batch material on each support.

5. A process as defined in claim 1 wherein during the step of heating at least part of the batch is at least partially melted while in the upper layers of a heap of batch material on the support.

6. A process as defined in claim 1 comprising directing at least part of the hot furnace gases to flow across and in contact with the top of a heap of batch material on the support.

7. A process as defined in claim 6 comprising directing at least part of the hot furnace gases to flow across and in contact with the bottom of the support and then to flow across and in contact with the top of a heap of batch material on that support.

8. A process as defined in claim 1 wherein during the step of heating the support is heated in part by heat transferred thereto from the hot furnace gases and in part by heat generated directly in the support by another energy source.

9. A process as defined in claim 1 wherein during the step of heating, an electric current is passed through batch material retained on the support thereby to generate heat in that material by Joule effect.

10. A process as defined in claim 1 comprising heating the batch to a temperature above 600° C. before feeding the batch onto the support.

11. Apparatus for use in pre-heating a vitrifiable batch prior to its introduction into a glass-melting furnace, comprising a feed shaft into which vitrifiable batch can be fed and providing a flow path for hot gases escaping from such furnace, at least one support in said shaft for temporarily supporting batch material while heat is transferred to it from such hot gases, said support including a plurality of spaced bars and disposed so that its bottom side forms part of the boundary of the gas flow path and so that between such support and the inner surface of the shaft there is a gap via which such gases can flow upwardly past and in contact with such support.

12. Apparatus for use in pre-heating a vitrifiable batch prior to its introduction into a glass-melting furnace, comprising, a feed shaft into which vitrifiable batch can be fed, at least one support in said shaft for temporarily supporting batch material, said support having apertures, heating means for heating batch material on such support to bring such material to a flowable condition in which it can flow downwardly through the support apertures, said heating means including electrodes between which an electric current can be passed for generating heat in said supported batch material by Joule effect.

13. Apparatus as defined in claim 12 wherein the support is disposed so that between such support and the inner surface of the shaft there is a gap via which said hot gases can flow upwardly past and in contact with such support.

14. Apparatus as defined in claim 12 wherein the support has a retaining wall, bordering the gap, for retaining a heap of batch material on such support.

15. Apparatus as defined in claim 12 wherein in the vicinity of the support there is a passageway for hot furnace gases which leads out of said shaft near the bottom of that support and back into said shaft at a position such that gases leaving that passageway will be directed across and in contact with batch material on such support.

16. Apparatus as defined in claim 12 comprising means for directly generating heat in the support.

17. Apparatus as defined in claim 12 wherein the support extends over the entire cross-section of said shaft.

18. Apparatus as defined in claim 12 wherein there is a plurality of supports located at different levels and in staggered relationship in said shaft so that said supports define with each other and with the inner surface of the shaft an undulating path for hot gases escaping from said furnace.

19. Apparatus as defined in claim 12 wherein the support is disposed horizontally.

20. Apparatus as defined in claim 12 wherein the support is formed by spaced bars.

21. Apparatus as defined in claim 20 wherein the support is formed by spaced hollow bars and further comprising means for circulating cooling medium through such bars.

22. Apparatus as defined in claim 12 wherein the bars have a between-bar spacing greater than 10 mm.

23. Apparatus as defined in claim 12 wherein there are at least two supports formed by spaced bars and located at different levels so that batch material can feed through one said support onto another and the supports are at different levels which have different between-bar spacings.

24. Apparatus as defined in claim 23 wherein the support has a between-bar spacing greater than that of at least one support disposed at a lower level in the shaft.

25. Apparatus as defined in claim 12 comprising means in the form of a variable-delivery vibrating distributor for feeding vitrifiable batch into said shaft.

26. Apparatus as defined in claim 12 comprising an inclined chute for guiding batch material from the bottom of said shaft into a glass-melting furnace.

27. Apparatus as defined in claim 12 wherein the support is formed by the heating means.

28. A process for pre-heating a vitrifiable batch prior to its introduction into a glass-melting furnace using hot gases from the melting furnace, comprising directly exposing at least one support having apertures to gases from the furnace, feeding at least part of the batch onto the apertured support, temporarily retaining batch material by such support, heating batch material on the support until it is in at least a partly molten condition in which it flows through the support apertures and, during the step of heating, heating the support in part by heat transferred thereto from the hot furnace gases and in part by heat generated directly in the support by another energy source.

29. A process for pre-heating a vitrifiable batch prior to its introduction into a glass-melting furnace using hot gases from the melting furnace, comprising directly exposing at least one support having apertures to gases from the furnace, feeding at least part of the batch onto the apertured support, temporarily retaining batch material by such support, heating batch material on the support until it is in at least a partly molten condition in which it flows through the support apertures and, during the step of heating, batch material while retained by the support is heated in part by heat transferred thereto from the hot furnace gases and in part by heat generated directly in such supported material by another energy source which includes passing an electric current through batch material retained on the support thereby to generate heat in that material by Joule effect.

30. A process for pre-heating a vitrifiable batch prior to its introduction into a glass-melting furnace using hot gases from the melting furnace, comprising directly exposing at least one support having apertures to gases from the furnace, feeding at least part of the batch onto the apertured support, temporarily retaining batch material by such support, heating batch material on the support until it is in at least a partly molten condition in which it flows through the support apertures; and heating the batch to a temperature above 600° C. before feeding the batch onto the apertured support.

* * * * *

UNITED STATES PATENT OFFICE
CERTIFICATE OF CORRECTION

PATENT NO. : 3,944,713
DATED : March 16th, 1976
INVENTOR(S) : Emile Plumat et al It is certified that error appears in the above-identified patent and that said Letters Patent are hereby corrected as shown below:

In the heading of the patent, under [30] Foreign Application Priority Data, change "Belgium" to --Luxembourg--.

Column 2, line 14, change "program" to --process--; line 16, change "segment" to --support--.

Column 3, line 22, change "However" to --Moreover--.

Column 5, line 35, change "from" to --for--.

Column 14, line 42, change "preferably" to --preferable--.

Signed and Sealed this

Sixth Day of July 1976

[SEAL]

Attest:

RUTH C. MASON
*Attesting Officer*

C. MARSHALL DANN
*Commissioner of Patents and Trademarks*